United States Patent [19]

Kanayama et al.

[11] Patent Number: 4,482,382
[45] Date of Patent: Nov. 13, 1984

[54] POURING REPAIR MATERIAL FOR MORTAR OR THE LIKE WALL

[75] Inventors: Hisayasu Kanayama, Tokyo; Yoshiaki Sasaki, Ebina; Naoki Furuno, Yokohama; Yoshitaka Sasaoka, Yokohama; Osamu Tokita, Yokohama, all of Japan

[73] Assignee: Nippon Kokan Kabushiki Kaisha, Tokyo, Japan

[21] Appl. No.: 494,933

[22] Filed: May 16, 1983

[30] Foreign Application Priority Data

May 19, 1982 [JP] Japan ............... 57-82989

[51] Int. Cl.$^3$ .................................. C04B 7/35
[52] U.S. Cl. ............................ 106/90; 106/97; 106/117
[58] Field of Search ................ 106/90, 97, 117

[56] References Cited

U.S. PATENT DOCUMENTS

| | | | |
|---|---|---|---|
| 2,987,407 | 6/1961 | Ulfstedt et al. | 106/97 |
| 3,002,843 | 10/1961 | Stocker | 106/97 |
| 3,096,188 | 7/1963 | Maydl | 106/97 |
| 4,390,372 | 6/1983 | Hardin | 106/90 |
| 4,398,957 | 8/1983 | Ceska et al. | 106/90 |

*Primary Examiner*—James Poer
*Attorney, Agent, or Firm*—Thomas H. Whaley

[57] ABSTRACT

The pouring repair material for mortar or the like wall characterized in that it consists essentially of a synthetic resin emulsion, cement and slags with particle size less than 0.5 mm, and in that the weight ratios P/C, C/S and W/C are adjusted to 0.1 to 3, 1.5 to 2.5 and 0.35 to 0.40, wherein P designates solid contents of the synthetic resin, C cement, S slags and W water.

9 Claims, 4 Drawing Figures

POURING REPAIR MATERIAL FOR MORTAR OR THE LIKE WALL

FIELD OF THE INVENTION

This invention relates to a fluid repair material or composition which may be poured into gaps or crevices developed in decorative wall of tiles, concrete or mortar used in building structures.

BACKGROUND OF THE INVENTION

Recently, on account of stringent housing site circumstances, high-storied residences or apartments are being built at an ever-increasing rate. In parallel therewith, office buildings tend to shift to high-storied or super high-storied structures.

An outer or inner, separate decorative wall is usually applied as a coating on the concrete base wall of the building for finishing, no matter whether the main building structure is of steel-reinforced concrete or the steel framed reinforced concrete.

After lapse of a certain time interval after completion of construction, these decorative walls start to peel off from the concrete base all structure due to the lowered bonding strength between the building base wall and the decorative coating wall.

It is believed that such exfoliation is caused at least in part by the fact that moisture contained in the external environment permeates through small crevices or pores in the decorative wall to its back side gradually eroding away the concrete base wall.

Moisture may be permeated to the reverse surface of the decorative wall in the form of water droplets, mist or steam. Therefore, in general, the outdoor side of the wall is more susceptible to exfoliation than the indoor side, because the outdoor side is exposed directly to climatic effects.

Taking an example of a decorative mortar outer wall, this partial exfoliation grows gradually and gives rise to a phenomenon known as separation or blister.

As this blister proceeds futher to the point that the bonding strength of the mortar to the building base is unable to sustain the weight of the wall, mortar is apt to peel off and thus is in need of repair. In addition, the wall may fall down and destroy surrounding articles or injure near-by persons.

Heretofore, in order to prevent such danger, the decorative wall is repaired at proper time periods determined through periodic tests in which the wall is struck lightly as with hammers and the sound produced by the wall is scrutinized acoustically.

In the conventional practice, such repair work is done through chipping away loose mortar followed by mortar reapplication or by pouring epoxy resin or the like resin adhesives through bored holes with the aid of a pouring gun, thereby preventing the wall from peeling off or continuing the progress of separation.

However, with the former method of chipping, the amount of mortar required in recoating and the number of steps are substantially the same as those required in local reapplication of the decorative wall. Moreover, since the moisture introduced into the gaps of the blisters as water vapor in condensed into dew, the bonding strength of the poured resin adhesives may be lowered. In addition, the resin composition itself is expensive and spread to diffuse when poured into the gaps of the blisters. Therefore, a strong demand has been placed for a more effective and inexpensive repair composition.

SUMMARY OF THE INVENTION

As a result of repeated and perseverant research, the present inventors have arrived at a first fluid pouring repair composition for making repairs on blisters where the gap between the outer decorative wall and the inner base wall is more than about 1 mm and consisting essentially of water, a synthetic resin emulsion, hydraulic cement and slag particles smaller than 0.5 mm in diameter, and a second fluid pouring repair composition containing, in addition to the ingredients of said first composition mentioned above, a filler in an amount corresponding to 1.0 to 3.0 wt. percent of the solid contents of the synthetic resin.

DETAILED DESCRIPTION OF THE INVENTION

The synthetic resin emulsion contained in the repair material of the present invention is designed to contribute mainly to increasing the bonding strength of the repair material. Most effective in this connection are an ethylenevinyl acetate copolymer, a styrene-butadiene copolymer, a styrene-butadiene copolymer partially modified with methacrylic acid ester, a liquid emulsion of these copolymers or partially modified polymer by other copolymerizable monomer or monomers, or other synthetic resin emulsion adapted for mixing with cement.

According to the present invention, use is also made of cement such as portland cement, portland blast furnace slag cement, which exhibits affinity to both the building base and the decorative outer wall and acts synergistically with the aforementioned synthetic resin emulsion to increase the bonding strength of the material.

According to the present invention, use is also made of slags with particle size less than 0.5 mm as essential ingredients. This specified size has been selected in consideration that the repair material is used in connection with blisters that may be encountered in the initial phase of separation of the decorative wall coating from the base wall undergoing repair where the space between the decorative wall coating and the base wall is more than 1 mm.

Figure 1:
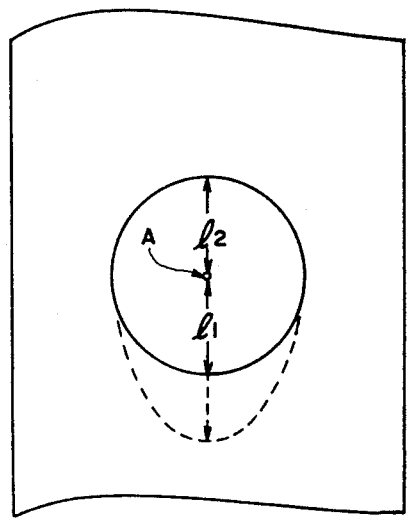
FIG. 1 is a diagrammatic view showing the injection or pouring point and the extent of permeation of the repair composition into a blistered area.

The aim of using these slags is that the repair composition may be spread concentrically about an injection or pouring point when the composition is poured into the gap caused by blistering. Referring to the FIG. 1 when the aggregates possibly used in the conventional practice, such as silica sand, is used place of the slags, and poured at a pouring hole A, it is spread in the form of an ellipsis and thus over a larger distance $l_1$ in the direction extending vertically upward than in the distance $l_2$ in the opposite direction. This phenomenon known as sagging may be excessive in extreme cases.

The repair composition which makes use of the aforementioned slags as aggregates in accordance with our invention shows a more pronounced thixotropic behavior than conventionally prepared compositions and provides the $l_2/l_1$ ratio closer to unity.

It should be noted also that, with an excessive specific weight of the slags as aggregates, the slags tend to settle out or be precipitated thus causing inconveniences during application. The lighter aggregates, such as those having a specific weight in the range of 2 to 2.6 give acceptable results. As typical of these slags may be mentioned water-granulated slags. As the case may be, these lighter slags may be mixed with other fine aggregates with a lower specific gravity.

It is believed that the desired effect attained with these slags may be attributed at least partially to complexity in the profile of the slags effective to cause a bridge phenomenon with the resultant arching effect.

In accordance with the present invention, the aforementioned essential ingredients are required to satisfy the following weight ratio.

Figure 2:
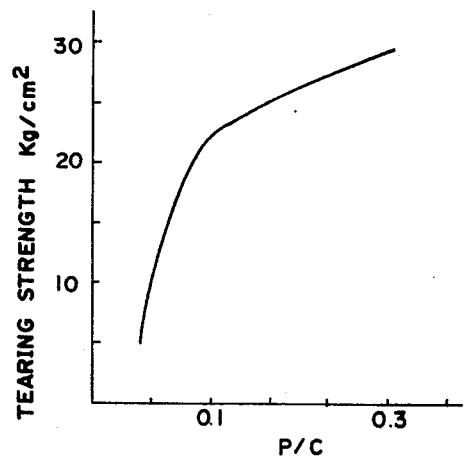
FIG. 2 is a graphical presentation of the relationship between P/C ratio in the repair material and tear strength of the repair material obtained.

Thus the weight ratio P/C, where P and C stand for solid contents of the synthetic resin and cement, respectively, should be in the range of 0.1 to 0.3, preferably 0.1 to 0.2. If the ratio is lesser than the specified range, as indicated in FIG. 2, the physical properties of the composition may be affected by the lowered bonding strength. When the ratio is higher than the above specified value, the repair composition may have an increased shrinkage rate and exhibit an increased tendency towards crack formation after application of the repair material.

The weight ratio C/S, where S stands for slag, should be in the range of 1.5 to 2.5.

Figure 3:
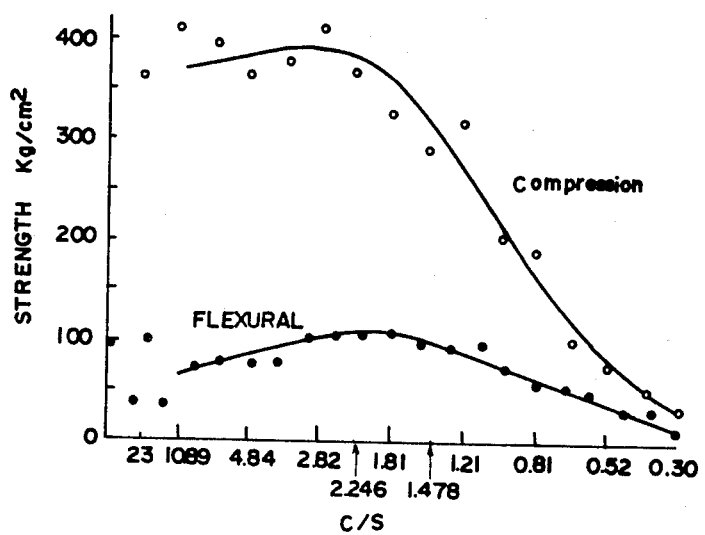
FIG. 3 is a graphical presentation of the relationship between C/S ratio in the repair material and compression and flexural strength of the repair material obtained.
Figure 4:
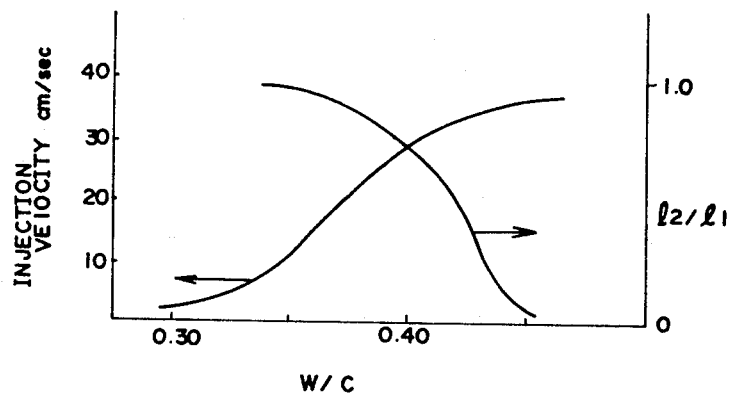
FIG. 4 is a graphical presentation of the relationship between W/C ratio in the repair material and behavior of injection velocity of the repair material obtained and state of phenomenon of sagging.

It can be seen from FIG. 3, that a weight ratio less than 1.5 is not preferred because of resulting inferior workability of the material.

On the contrary, the ratio higher than 2.5, the hardening period of the material becomes short but its strength becomes low.

The ratio W/C, where W stands for water, should be in the range of 0.35 to 0.40, preferably 0.360 to 0.390. This ratio lesser than 0.35 is not preferred because of sagging and resultantly reduced workability of the material. The ratio larger than 0.40 also is not preferred because of increased breathing. Occasionally it may be impossible to carry out an acceptable repair work because of sagging.

It should be noted that the water to be supplied from the synthetic resin emulsion is not sufficient to meet the demand of water and hence need be supplied separately so that the aforementioned W/C rate may be satisfied.

The present invention is also directed to a repair material containing a filler in addition to the ingredients of the firstly mentioned repair material, said filler being contained in an amount corresponding to 1.0 to 3.0 wt. percent of the solid resin content in the synthetic resin emulsion.

When the amount of filler is less than 1.0 wt. percent of the solid resin, the thixotropic character of the repair material is not significantly improved.

On the other hand, when the amount of filler is higher than 0.3 wt. percent, the yield point of the repair material obtained becomes excessively high.

With addition of this filler, there may be obtained a repair material applicable to repair the gap between the building base wall structure and the decorative outer wall affected by more severe separation, namely the gap where the separation between the base and the outer wall is 5 to 10 mm or more. In this case, the repair work can be done without causing sagging of the pouring material or without interfering with the overall repair work even if a certain amount of sagging should take place when pouring the repair material.

Silica or asbestos are most preferred as fillers used for this purpose. As a matter of course, the particle size of these fillers should be selected so that the fillers can be diffused into and permeated through the gaps of the blisters and without stopping up injection nozzles. Preferable particle size is 10 to 20 $\mu$m or up to 40 $\mu$m maximum when silica is used and about 0.025 $\mu$m$\phi \times$5 $\mu$m when asbestos is used.

It should be noted that dewatering agents, retarders, hardening accelerators, foaming agents or water-proofing agents may be added to the aforementioned first or second repair compositions without of course thereby counteracting the object and effect proper to the present invention.

When pouring the repair material, suitable pumping systems may be used as a function of the repair work scale and advantageously at an injection pressure of 0.5 to 1.5 kg/cm$^2$.

It should be noted that the repair material of the present invention may be used not only in repairing the separation between the building base wall and the decorative outer wall, but also for doing a variety of customary repair jobs, such as filling the surface cracks on the decorative outer wall or stopping the joints.

When the material tends to be mismatched in color to the decorative outer wall, colored polymer cement mortar may be used as another ingredient of the present pouring repair material. It will be appreciated from the foregoing that the repair composition of the present invention may also be applied for repairing the ceiling or wall inside the building or residence.

The present invention will be described further by referring to an example.

EXAMPLE

A mixture composed of 20 parts of a styrene-butadiene copolymer emulsion (48% solid content by weight), 50 parts of blast-furnace cement, and 30 parts of water-granulated slags with particle size less than 0.5 mm and specific gravity equal to 2.2 (material A) was prepared. Another mixture (material B) was prepared by adding 0.1 wt. percent of a filler (silica) to the material A. With the use of these pouring materials A and B, repair works were made of actual blisters caused in the building wall.

The pumping injection system was used in the repair work with the use of an injection nozzle with an outside diameter of 11 mm and an inside diameter of 8 mm. The test results are shown in the Table below.

|  | Material A | Material B |
| --- | --- | --- |
| blister mm | 3 | 8 |
| injection pressure, kg/cm$^2$ | 1 | 1.5 |
| injection speed, cm/sec | 27 | 19.5 |

-continued

|  | Material A | Material B |
| --- | --- | --- |
| $l_2/l_1$ rate | 0.6–0.85 | 0.6–0.75 |
| flexural strength, kg/cm² | 92.4 | 111.9 |
| tearing strength, kg/cm² | 16 | 16 |
| water absorption, vol % | 2.42 | 3.13 |
| shrinkage, % | −2.24 | −1.82 |

What is claimed is:

1. A fluid pouring repair material for mortar or the like wall which consists of a synthetic resin emulsion, hydraulic cement and aggregate slags with particle size less than 0.5 mm, and water as required to satisfy the following weight ratios wherein the weight ratios P/C, C/S and W/C are within the range of 0.1 to 0.3, 1.5 to 2.5 and 0.35 to 0.40, respectively, wherein P designates the solid content of the synthetic resin emulsion, C cement, S slags and W water.

2. A pouring repair material for mortar or the like wall as claimed in claim 1 wherein the P/C ratio is from 0.1 to 0.2.

3. A pouring repair material for mortar or the like wall as claimed in claim 1 wherein the W/C ratio is from 0.360 to 0.390.

4. A fluid pouring material for mortar or the like wall according to claim 1 said synthetic resin emulsion contains an added filler in an amount within the range of 1.0 to 3.0 wt. percent of the solid contents of synthetic resin.

5. A composition according to claim 4 wherein said filler is selected from the group consisting of silica having a particle size range of from about 10 to about 40 μm and asbestos having a particle size of about 0.025 μmφ×5 μm.

6. A composition according to claim 1 wherein said synthetic resin is selected from the group consisting of an ethylene-vinyl acetate copolymer, a styrene-butadiene copolymer, and a styrene-butadiene copolymer partially modified with methacrylic acid ester.

7. A composition according to claim 1 wherein said hydraulic cement is Portland cement.

8. A composition according to claim 1 wherein said hydraulic cement is blast furnace slag cement.

9. A method for repairing a blister in a composite wall comprising a concrete base wall and a decorative mortar wall coating wherein said blister is formed by separation of the decorative wall coating from the base wall leaving a space therebetween which comprises injecting through an opening in said decorative wall into the space formed by the blister a fluid composition consisting a hydraulic cement, water, synthetic resin emulsion, and aggregate slag having a particle size less than about 0.5 mm in the ratios P/C, C/S and W/C within the range of 0.1 to 0.3, 1.5 to 2.5 and 0.35 to 0.40, respectively, wherein P designates the solid content of the synthetic resin emulsion, C cement, S slags, and W water, thereby forming an adhesive bond between said base wall and said wall coating.

* * * * *